July 21, 1970　　　H. D. VANDERLIP ETAL　　　3,521,430
AIR FILTER WITH FLUIDIC TIMING MECHANISM
Filed May 20, 1968　　　　　　　　　　　　　　4 Sheets-Sheet 1

INVENTOR.
JACK W. KICE
HERBERT D. VANDERLIP
BY
ATTORNEYS

INVENTOR.
JACK W. KICE
HERBERT D. VANDERLIP
BY
ATTORNEYS

United States Patent Office 3,521,430
Patented July 21, 1970

3,521,430
AIR FILTER WITH FLUIDIC TIMING MECHANISM
Herbert D. Vanderlip and Jack W. Kice, Wichita, Kans., assignors, by mesne assignments, to Jack W. Kice, Russell W. Kice, and James V. Kice, doing business as K-B Engineering Company
Filed May 20, 1968, Ser. No. 730,480
Int. Cl. B01d 46/04
U.S. Cl. 55—283      14 Claims

ABSTRACT OF THE DISCLOSURE

An air filtering system using high volume, low pressure air to sequentially blow down or cause a reverse air flow through a plurality of filtering bags or containers to remove the impurities attached thereto. More specifically, a filtering system is disclosed having a fluidic actuated timing system operable to periodically and automatically release a large volume of low pressure air to respective ones of a plurality of filtering bags for the cleansing thereof. Also a fluidic timing mechanism system is disclosed having and air supply reservoir, a rapid release valve means connected to the air supply reservoir, an air actuated control valve, and a diaphragm valve means connected to the rapid release valve means, all operable under variations of air pressure to automatically sequentially release large volumes of low pressure air for the cleansing of air filtering bags, the system is dependent upon air pressure only without any electrical connections or external power sources thereto which are dangerous in the conveyance of dust particles in flour mill, etc.

---

Various types of filtering systems are known to the prior art operable to remove dust particles and the like from the air for recovery and/or for atmospheric cleansing control. These filtering systems are normally used in conveyance systems found in flour mills, cement factories, carbon black manufacturing industries, etc., and operated in an explosive dust-type atmosphere. A plurality of downwardly depending filtering bags are normally used to separate the conveyor particles from the air medium requiring a periodical cleansing of the filtering bags to release the material gathering on the outer sides thereof. Numerous systems utilize a high pressure back flow or blow down reverse air flow to the filtering bags from the output side to release the collected particles therefrom. However, it has been found that the use of high pressure air requires considerable power from an air compressor and the entrailed oil and moisture vapors in the compressed air tends to build up a very undesirable residue inside the filtering bags that eventually prevents the same operating efficiently. Additionally, this causes an excessive filter pressure resistance and eventually the filter bags become clogged and must be replaced which tends to become a quite expensive cost operating factor. Additionally, the prior art devices used are generally precisioned, high cost structures requiring combined orifice and venturi features to achieve the required reverse air flow at high pressure to cleanse the filtering bag structures.

In accordance with the present invention, a new filtering system using a fluidic timing mechanism is provided having an enlarged air filtering housing with a plurality of filtering bags mounted therein; an air inlet connected to the housing to provide air to be filtered thereto on the input side of the filtering bags; an air outlet or clean air plenium mounted on the output side of the filtering bags to convey the cleansed air therefrom; and a fluidic timing mechanism secured to one side of the housing operably connected through a piping system to provide air outlets at the upper output ends of the respective filtering bags to provide a large volume, low pressure cleansing air thereto. The fluidic timing mechanism includes a large air reservoir tank mounted upon a support bracket secured to the filtering housing having an air supply means connected thereto; a rapid release, air valve means connected as by a conduit to the air reservoir tank to receive pressure fluid therefrom; an output opening on the rapid release air valve means connected to the piping means to permit large volume, low pressure air flow from the storage reservoir to the filtering bags on opening of the release air valve means; a diaphragm valve means connected to the rapid release; an air actuated control valve connected to the diaphragm valve means to regulate direction of air flow thereto; and an air actuated, four-way slide valve member connected to the output side of the rapid release air valve, the control valve, and an adjacent slide valve member. The fluidic timing mechanism may be composed of any number of combinations of the above-mentioned valves with the output side from the rapid release air valve means connected to a plurality of the filtering bags so that each rapid release valve means may be operable to cleanse two, four, six or any desired number of the respective air filtering bag members. The rapid release valve means is provided with a biased piston member operable to close the entrance and exit openings therethrough and being normally held in the closed position. The piston member is provided with an elongated slot to permit air pressure to be admitted on both sides thereof whereupon the release of air pressure on one side will cause the high pressure on the opposite side to rapidly move the piston member to the full open position allowing for the rapid release of air pressure to the respective outlet conduit and air filtering bags. The air actuated control valve is in constant communication with the storage reservoir and, on reaching a pre-set pressure, the same is actuated to release pressure from the diaphragm valve means which at the same time releases pressure from one side of the rapid release valve means causing operation and rapid opening thereof. In other words, the air filtering system with the fluidic timing mechanism of this invention is operable on a timing principle reaching a predetermined air pressure within the air reservoir tank and conveying the same to a valve to provide for the automatic, controlled operation of a plurality of such interconnected series of the fluidic timing mechanisms.

Accordingly, it is an object of this invention to provide a new and novel air filtering system having the fluidic timing mechanism of this invention overcoming the above-mentioned disadvantages of the prior art devices.

Another object of this invention is to provide an air filtering system with a fluidic timing mechanism releasing a large volume, low pressure fluid medium sequentially and periodically to cause reverse flow within a plurality of filtering bag assemblies for the cleansing thereof.

Still, another object of this invention is to provide an air filtering system having a fluidic timing mechanism operable in an explosive-type atmosphere having an air actuated timing mechanism operable to automatically and sequentially cause reverse flow within a plurality of filtering bag assemblies thereby providing for the utmost safety in this type of environment.

One other object of this invention is to provide a fluidic timing mechanism, usable within an explosive atmosphere as the same requires only air pressure for the operation thereof, including a rapid release valve means operable from the fully closed to the fully opened position in a minimum amount of time thereby releasing large volume of low pressure air therethroubh which is highly desirable in many operations as low pressure air can be produced without impurities for low cost and ease of maintenance.

A still further object of this invention is to provide an air filtering system that is economical to manufacture, dependable in operation, simple to operate, completely safe in explosive type atmospheres, and substantially maintenance free.

Various other objects, advantages, and features of the invention will become apparent to those skilled in the art from the following discussion, taken in conjunction with the accompanying drawings, in which:

The following is a discussion and description of preferred specific embodiments of the new air filtering system of this invention, such being made with reference to the drawings, whereupon the same reference numerals are used to indicate the same or similar parts and/or structures. It is to be understood that such discussion and description is not to unduly limit the scope of the invention.

Figure 1:
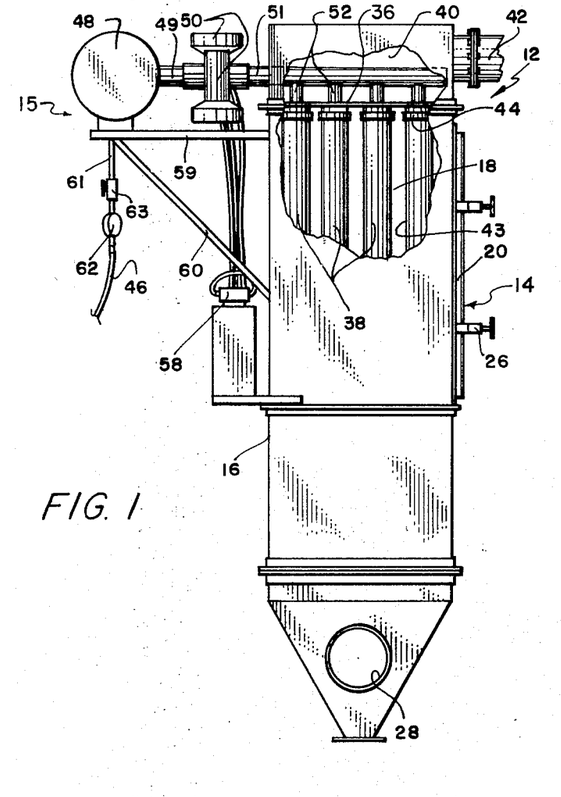
FIG. 1 is a side elevational view of an air filtering system having the fluidic timing mechanism of this invention connected thereto.
Figure 2:
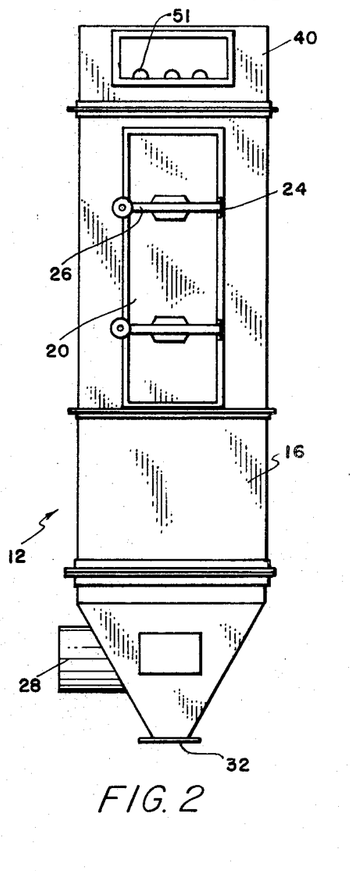
FIG. 2 is a front elevational view of the air filtering system of this invention.
Figure 3:
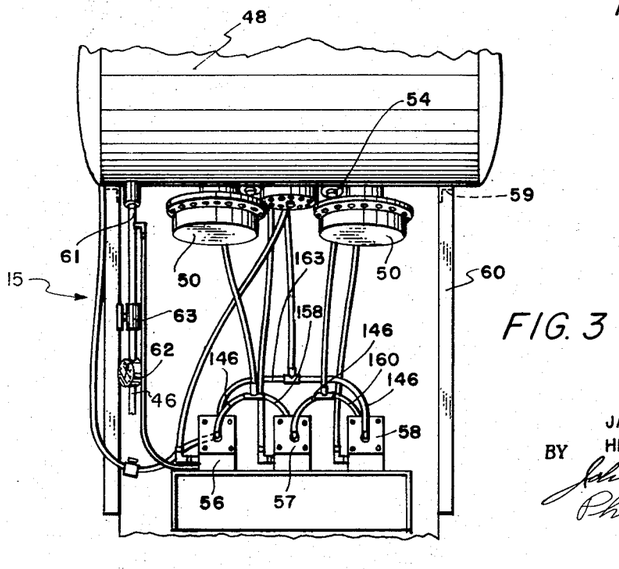
FIG. 3 is a fragmentary rear elevational view of the air filtering system illustrating the fluidic timing mechanism mounted thereon.

Referring to the drawings in detail and in particular to FIG. 1, the air filtering system of this invention, indicated generally at 12, includes an enlarged filtering means 14 having the specific fluidic timing mechanism 15 of this invention connected thereto for the controlled operation and cleansing thereof. The air filtering system 12 is generally used in pneumatic systems to convey granular material with air pressure and such systems are commonly found in flour mills, chemical manufacturing systems, cement factories, and the like.

More specifically, the filtering means 14 includes an enlarged air-tight housing 16 having a chamber 18 with an access door 20 mounted thereon. The access door 20 is pivotally connected as by hinges 24 to an enlarged opening and secured in the closed position as by conventional pressure lock members 26. An inlet conduit 28 is provided at a lower tapered portion of the housing 16 to convey the material therein for subsequent discharge through a lower opening 32 into a hopper, a control valve, or the like. Therefore, it is seen that the material moving through the inlet conduit 28 is intended to be discharged through the lower opening 32 but the pneumatic pressure used to convey the material is contained within the housing 16 whereupon the same needs to be cleansed and released which is the purpose of this air filtering system 12. An upper portion of the housing 16 is separated from the chamber 18 as by transverse separation plate 36 having a plurality of openings therein in which are mounted, respectively, elongated filtering bag assemblies 38. Above this separation plate 36 is a clean air plenum 40 having an outlet conduit 42 secured thereto for conveyance of the fluid therefrom. Each of the filtering bag assemblies 38 is of a substantial conventional construction having an inner support wire structure (not shown) having a filtering bag 43 of soft or woven wool material mounted thereon and secured thereto as by a clamp member 44. The filtering bags 43 are of an elongated cylindrical shape operable to permit only the passage of minute air particles therethrough. In normal operation of the air filtering means 14, it is obvious that a portion of the material being conveyed thereto is drawn by the air flow to the outer surfaces or inlet sides of the filtering bags 43 and would subsequently tend to clog the pores therein. Therefore, there is a requirement that these bags need to be cleansed frequently, accomplished by the reverse flow of air from an outside source through the filtering bags 43 to cause an air shock to remove material and particles contained thereon. This invention relates to a new and novel way for efficiently and effectively obtaining a cleansing operation.

The fluidic timing mechanism 15 includes an air pressure supply 46; an air reservoir tank 48; a plurality of rapid release air valve means 50 each provided with a connection by a conduit 49 to the reservoir tank 48 and also to an outlet conduit 51 having downwardly depending discharge tubes 52 positioned at the open end and extended downwardly within respective filtering bag assemblies 38; a first valve means or diaphragm valve means 54 connected to respective ones of the rapid release valve means 50; a second valve means or air actuated control valves 55 connected to respective ones of the diaphragm valve means 54; and a plurality of third valve means or slide valve members 56, 57, and 58, interconnected to each other, respective ones of the control valves 55, and also to respective ones of the outlet conduits 51 of the rapid release air valve means 50 for sequential operation as will be explained.

The reservoir tank 48 is of a large cylindrical type adapted to receive a large volume of air therein and mounted on the rearward side of the housing 16 as by a shelf 59 and interconnected support brackets 60. The reservoir tank 48 is provided with an inlet conduit 61 connected to an air pressure supply source having a gauge 62 to indicate the air pressure and also a control valve 63 to regulate the amount of air being supplied to the reservoir tank 48 for an important function as will be explained.

Figures 4, 5:
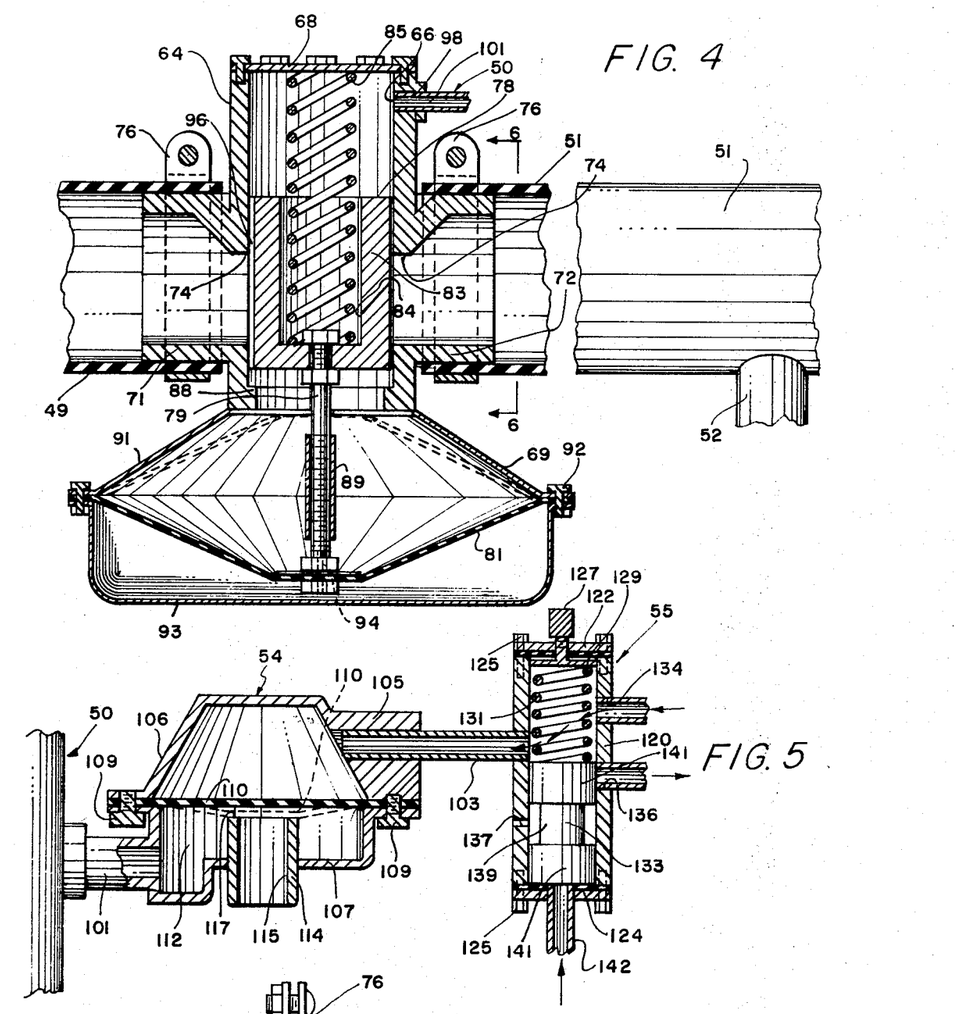
FIG. 4 is an enlarged fragmentary sectional view of the rapid release air valve means of the fluidic timing mechanism of this invention.
FIG. 5 is an enlarged fragmentary sectional view of the interconnected rapid release valve means, diaphragm valve means, and control valve of the fluidic timing mechanism of this invention.
Figure 6:
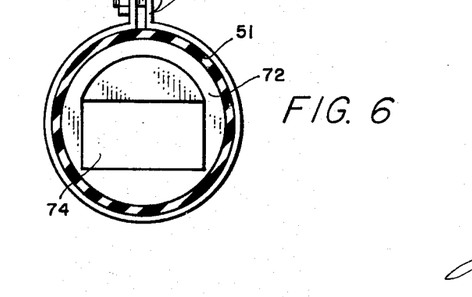
FIG. 6 is a sectional view taken along line 6—6 in FIG. 4.

As shown in FIG. 4, each rapid release valve means 50 includes a cast main housing 64 having an elongated enlarged vertical opening 66 having one end closed as by a bolted cover plate 68 and the opposite open end is secured as by welding or the like to a diaphragm housing 69. The cast housing 64 is further provided with laterally extended connector hub sections 71 and 72 in alignment with each other and having outermost sections provided with cylindrical peripheral surfaces and innermost portions tapered downwardly to rectangular openings 74 into the opening 66. The connector hubs 71 and 72 are connected to the inlet conduit 49 and the outlet conduit 51, respectively, by clamp members 76. The valve means 50 further includes a piston assembly 78 having one end connected as by an elongated rod 79 to a diaphragm member 81 mounted within the diaphragm housing 69. The piston assembly 78 is provided with a piston member 83 having an outer surface in sliding engagement with the opening 66 and a central bore 84 adapted to receive a compression spring 85 having its upper end in contact with the cover plate 68. Downward movement of the piston member 83 under force of the compression spring 85 is limited by an inwardly extended flange 88 of the main housing 69 in the opening 66. The piston rod 79 is provided with an upper end mounted within the bore 84 having lock nuts against the upper and lower surfaces of the piston member 83 to anchor the same thereto. A connector sleeve 89 mounted on the piston rod 79 which is formed in two sections, provides for axial adjustment thereof. The lower end of the piston rod 79 is secured to the center of the diaphragm member 81 as by having a hole therein with nut members mounted on opposite sides of the diaphragm member 81 with washers therebetween to securely clamp the same thereto. The diaphragm housing 69 includes an upper downwardly diverging section 91 having its outer lower periphery secured as by plurality of bolt members 92 to a lower pan shaped section 93. It is seen that the outer periphery of the diaphragm member 81 is mounted between the interconnected upper section 91 and lower pan member 93 in a clamped relationship. The lower end of the piston rod 79 is provided with an opening 94 extended from the upper to the lower sides of the diaphragm member 81 whereupon there is a restricted fluid communication to both sides thereof.

Figure 7:
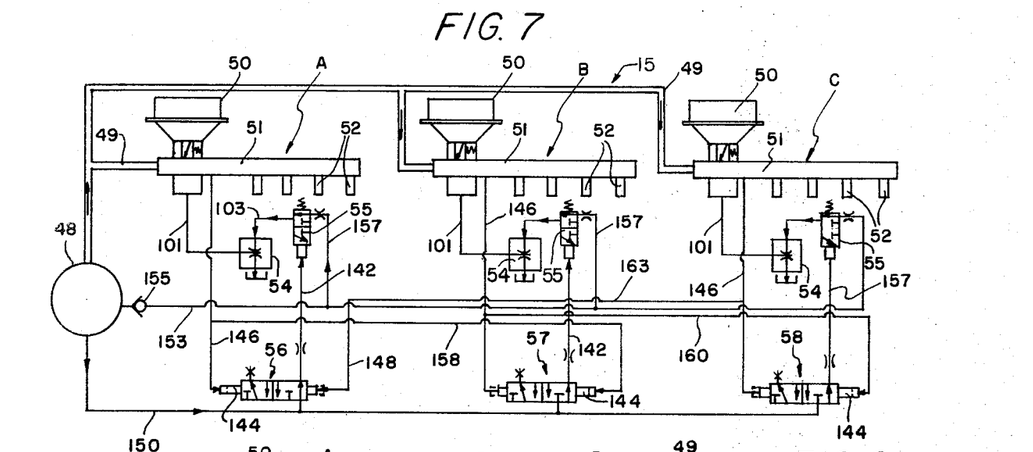
FIGS. 7, 8, and 9 are schematic diagrams showing the automatic sequential operation of the air filtering system of this invention.

The piston member 83 can conveniently be provided with an upright axially extended groove 96 on the outer peripheral surface in communication with the rectangular opening 74 on the inlet conduit 49 for fluid flow from the inlet side to the spaces both above and below the piston member 83 for reasons to be explained. The outlet conduit 51 of the rapid release valve means 50 is of an elongated tubular shape having a plurality of the downwardly depending outlet tubes 52 thereon (FIG. 4). It is seen that these tubes 52 extend into the upper openings of the respective filtering bag assemblies 38 and are of such a size to present unrestricted flow therethrough in a manner to be explained. As shown in FIG. 7, each of the outlet conduits 51 has four downwardly depending tubes 52 and thereby operable to cleanse four filtering bag assemblies 38 concurrently; however, it is obvious that each conduit 51 could be placed in fluid communication with any number of the filtering bag assemblies 38 depending upon the cleansing efficiency to be achieved relative to the volume of air supply and the size of the filter bags 43 themselves. The upper portions of the cast housings 64 of the rapid release valve means 50 are provided with outlet openings 98 connected as by pipes or conduits 101 to the respective diaphragm valve means 54 which, in turn, are connected by respective conduits 103 to the air actuated control valves 55. It is to be understood that reference to upper and lower in regards to the rapid release valve means 50 is relative to FIG. 4 as the valve means are operable in any position.

More specifically, the diaphragm valve means 54 are provided with irregularly shaped housings 105 having upper cup-shaped sections 106 secured to lower control sections 107 as by a plurality of bolt members 109. Mounted between the upper sections 106 and the lower sections 107 in clamped relationships by the bolt members are flexible diaphragms 110 movable by differential air pressure. The lower sections 107 are provided with cavities 112 having central tubular hub sections 114 with central air release openings 115 therein. The hub sections 114 are provided with upper sealing surfaces 117 in close proximity to the respective flexible diaphragms 110. Therefore, upon having an air pressure in the upper sections 106 acting against the diaphragms 110, it is obvious that the same would be moved downwardly under this force into contact with the sealing surfaces 117 as shown in dotted lines in FIG. 5. However, on release of the air pressure, it is obvious that there would be air flow from the rapid release valve means 50 through the respective conduits 101 to the cavities 112 and through the air release openings 115.

As shown in FIG. 5, each air actuated control valve 55 is provided with a cylindrical housing 120 having upper and lower cover plates 122 and 124 secured thereto by bolt members 125. The upper plate 122 is provided with a central opening adapted to receive an adjustment screw 127 therein for axial movement to adjust the force on a plate member 129 against a compression spring 131. The lower plate 124 is provided with a central opening having a pressure line connected thereto operable to act on the lower end of an actuator plunger 133 slidably mounted within the cylindrical housing 120. A pair of adjacent openings 134 and 136 are provided on one side of the cylindrical housing 120 to control fluid flow therethrough on axial movement of the plunger 133 as will be explained. An additional opening 137 is provided in the housing 120 for controlled pressure release. The actuator plunger 133 is provided with a central cylindrical shaft 139 having piston portions 141 connected to opposite ends thereof operable to control fluid flow to the openings 134, 136, and 137 as will be explained. The movement of the plunger 133 is regulated by pressure through a line 142 on the lower end and the compression spring 131 against the top piston portion 141.

As the slide valve members 56, 57, and 58 are identical, only one need be described in detail. The slide valve member 56 is provided with a main central housing having a slidable control plunger 144 mounted therein movable from one end to the opposite end under pressure supplied at opposite ends by conduits 146 and 148. It is seen that the conduit 146 is connected to the outlet conduit 51 near the respective rapid release valve means 50. The other conduit 148 is connected to the slide valve member 58 and its conduit 146 from its respective rapid release valve means 50. Additionally, the slide valve member 56 is connected to a line 150 to the reservoir tank 148 which is common to the slide valves 57 and 58 and, in turn, is connected to the lines 142 to the air actuated control valves 55. It is seen that the slide valve member 56 operates to control fluid flow to the respective air actuated control valves 55 in each particular combination of valve elements.

Figure 8:
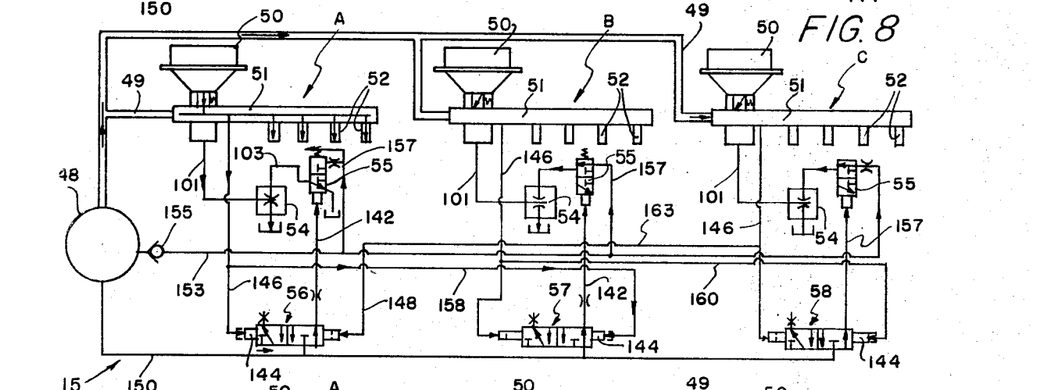
Figure 9:
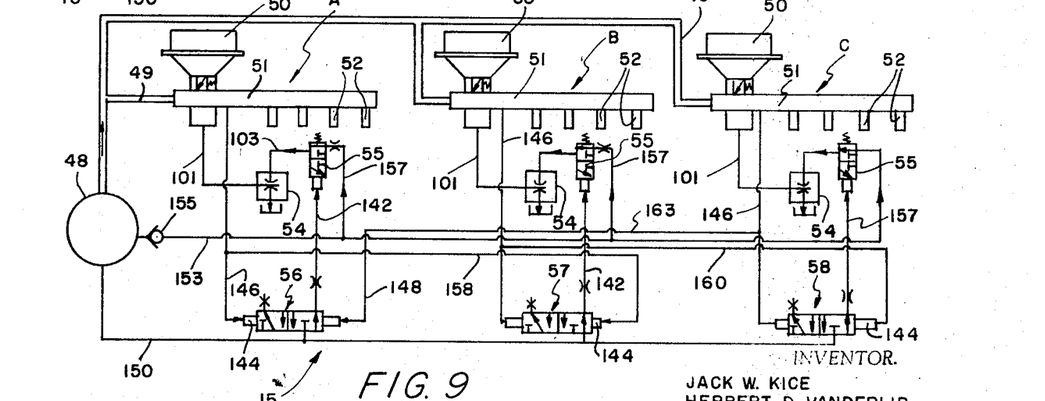

In the use and operation of the fluidic timing mechanism 15 as shown in FIGS. 7-9, inclusive, we shall illustrate the same as having three combinations of the specific rapid release air valve means 50, diaphragm valve means 54, air actuated control valve 55, and respective slide valve member 56, 57, and 58 and will identify each separate combination which is to be operated sequentially as systems A, B, and C. Each of these systems A, B, and C are all commonly supplied with air pressure through the conduit 150 to the slide valves 56, 57, and 58 by a conduit 153 to the respective control valves 55 and to the conduit 49 from the reservoir tank 48 to the respective ones of the rapid release air valve means 50. As shown in FIG. 7, system A is provided with the slide valve member 56 positioned towards the left side whereupon air is supplied to the conduit 150 and line 142 to the respective control valve 55. Additionally the conduit 153, having a one-way check valve 155 therein, is connected to the upper inlet opening on each one of the air actuated control valves 55. With each of the control valves 55 in the downward position as shown in FIG. 5 and in A, B, and C of FIG. 7, it is seen that air is supplied into the conduit 103 and through into the upper section of the respective diaphragm valve means 54 to move the diaphragm 110 into sealing engagement with the respective sealing surface 117. In the assumed condition of FIG. 7, it is seen that the plungers of the slide valve members 57 and 58 of systems B and C, respectively, are positioned to the right so that pressure is not supplied to the lower end of the respective air actuated control valves 55.

Now, it is seen that air is continually supplied at a controlled rate to the reservoir tank 48 whereupon this air pressure in system A is conveyed by conduits 153, 157, and 103 to the diaphragm valve means 54; by the conduit 150 and line 142 to the lower end of the actuator plunger 133 of the air actuated control valve 55; and additionally, air is supplied through the conduit 49 to the respective rapid release valve means 50 where the air is passed through the groove 96 on the piston member 83 above and below the same and to both sides of the diaphragm member 81. Next, as an increasing pressure acts upon the air actuated control valve 55, the plunger 133 is moved upwardly against the compression spring 131. Upon the upper block portion 141 moving past the opening of the conduit 103 to the diaphragm valve means 54, the upper section 106 is in fluid communication to the opening 115 which connects the fluid to discharge as shown in FIG. 8. This immediate release of pressure in the diaphragm valve means 54 operates to move the diaphragm 110 to the position as shown in FIG. 5 allowing the air within the upper chamber of the rapid release valve means 50 to exit through the conduit 101 and opening 98 to immediately release pressure against the same. This rapid release of pressure causes a great amount of unbalance against the piston member 83 causing the same to move upwardly rapidly with fluid flow through the outlet conduit 51 into the discharge tubes 52 into the upper openings of the filtering bag assemblies 38. This immediate release of pressure in the upper chamber causes a rapid movement of the piston member 83 with sufficient momentum to bottom out its upper surface against the cover plate 68. In order to give more adjustability and controlled operation to the rapid release valve means 50, the diaphragm member 81 is provided so that, initially, air pressure within the lower chamber is communicated to both sides of the diaphragm member 81 whereupon movement of the piston member 83 is further increased in overall force thereon assuring bottoming out against the cover plate 68. Also, it is obvious that the regulation of the size of the orifice opening 94 in the piston rod 79 changes the resultant force and movement of the piston member 83. However, it has been found in testing that rapid opening of the piston member 83 can be achieved without the interconnected piston rod 79 and diaphragm member 81 as there is sufficient force against the lower surface of the piston member 83 to cause the same to achieve rapid momentum to force the same upwardly and allow passage of air therethrough.

At the same time that the air is discharged through the rapid release valve means 50 of system A, the conduit 146 is provided with air pressure to act against the one end of the slide valve member 56 to move the same to the right as shown in FIG. 8. Concurrently, the conduit 146 is connected by a conduit 158 to the slide valve member 57 in system B to move the same rapidly to the left (FIG. 8). It is seen that system C is not effected by the actuation of the rapid release air valve means 50 of system A. In system B, fluid is now supplied to the lower end of the plunger 133 in the respective air actuated control valve 55 for the same to be moved upwardly against the compression spring 131 on pressure building up within the reservoir tank 48. The system C remains in the same condition as described in FIG. 7 until system B is actuated as previously described for system A. In system B air is released in the diaphragm valve means 54 on the movement of the plunger 133 of the control valve 55 to release pressure tn the rapid release valve means 50 causing the same to discharge high volume, low pressure air into the inner connected tubes 52 in another set of the filter bag assemblies 38. This creates a pressure within the respective conduit 146 against the slide valve member 57 and a conduit 160 connected to the right side of the slide valve member 58 of system C causes the same to be moved to the left to repeat the previously mentioned actuation operations for systems A and B. On operation of system C, the slide valve 56 is moved to the position of FIG. 7 by air pressure through a conduit 163.

Figure 11:
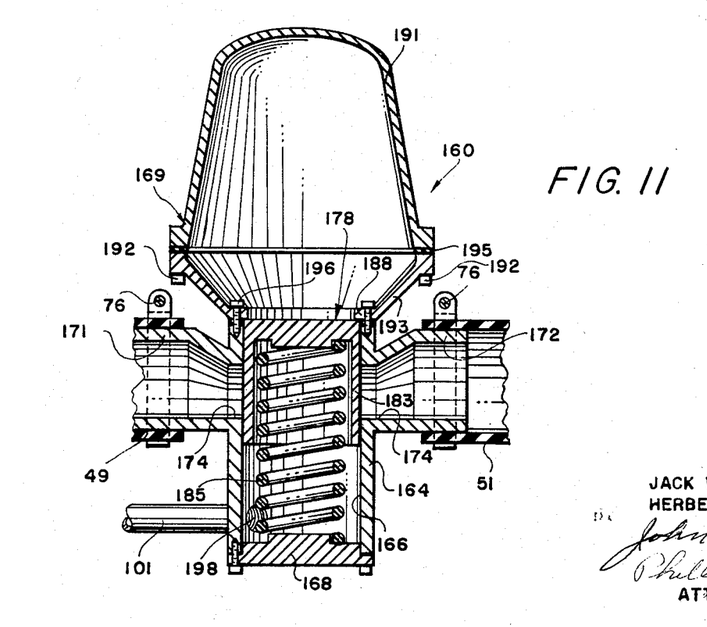
FIG. 11 is an enlarged fragmentary sectional view of a second embodiment of the rapid release air valve means of the fluidic timing mechanism of this invention.

A second embodiment of a rapid release valve, indicated generally at 160 in FIG. 11, includes a main cast housing 164 having an elongated enlarged vertical opening 166 with one end closed as by a bolted cover plate 168 and the opposite open end is enclosed by a diaphragm housing 169. The cast housing 164 is further provided with laterally extended, aligned connector hub sections 171 and 172 having outermost sections provided with cylindrical peripheral surfaces and the inner portions tapered downwardly to rectangular openings 174 meeting the opening 166. The connector hubs 171 and 172 are connected to the inlet conduit 49 and the outlet conduit 51, respectively, by clamp members 76. The valve means 160 further includes a piston assembly 178 having a piston member 183 with an outer surface in sliding engagement with the opening 166 and a central bore 184 adapted to receive a compression spring 185 having its lower end in contact with the cover plate 168. Upward movement of the piston member 183 under force of the compression spring 185 is limited by an inwardly extended flange portion 188 of the main housing 169. The diaphragm housing 169 includes an upper bell housing 191 having its lower outer periphery secured as by a plurality of bolt members 192 to a lower bowl shaped connector section 193. It is seen that the bell housing 191 is provided with a gasket 195 between the same and the lower section 193 and the housing 191 is removable for access to bolts 196 which anchor the connector section 193 to the main cast housing 164.

In this embodiment, the piston member 183 is not provided with an axially extended groove at its outer edge as in the other embodiment as it has been found that the piston member 183 may be machined of slightly smaller diameter than the opening 166 so that there will be fluid leakage thereabout to both sides thereof. The lower portion of the cast housing 164 is provided with an outlet opening 198 connected through the conduit 101 to the respective diaphragm valve means 54 which, in turn, is connected by respective conduits 103 to the air actuated control valves 55.

It is seen, therefore, that the rapid release valve means 160 is operable in a manner similar to the valve means 50 as previously described in the operation of this invention, the primary difference being the lack of a diaphragm member within the housing 169 operably connected to the piston assembly 178. The valve means 160 is operable by pressure being supplied to both sides of the piston member 183 creating an equilibrium condition with a rapid release of the pressure through the conduit 101 operating to cause a rapid downward movement of the piston member 183 to quickly open the outlet conduit 51 to the inlet conduit 49. It has been found that, with the enlarged bell housing 169, sufficient air volume in this cavity produces a rapid downward movement of the piston member 183 wherein the same actually bottom out on the upper surface of the cover plate 168 in a most efficient manner.

Figure 10:
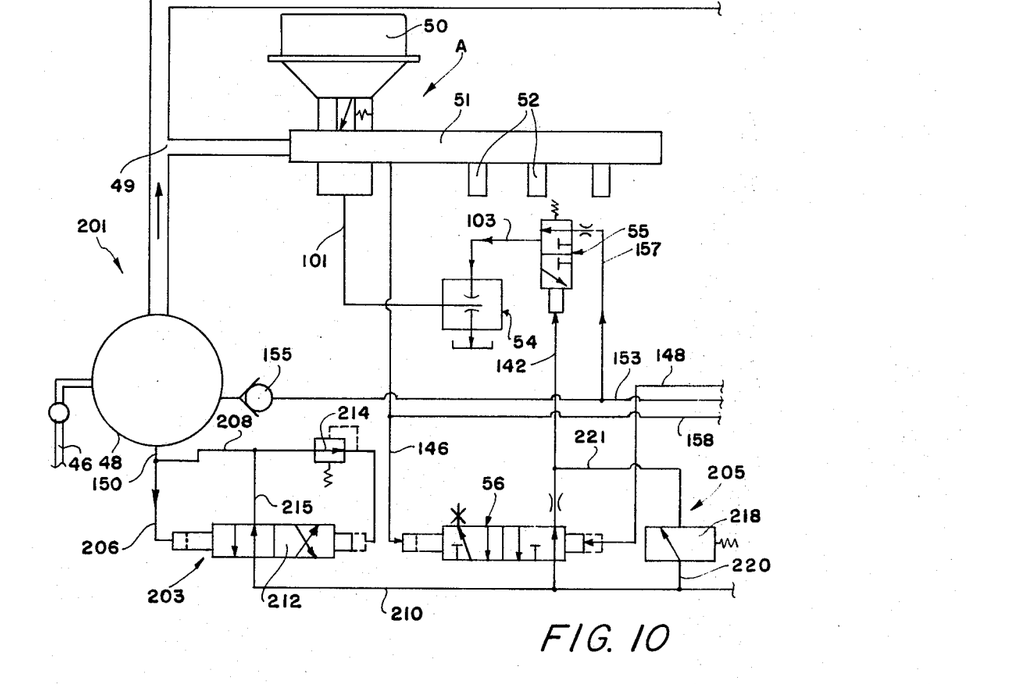
FIG. 10 is a fragmentary schematic diagram similar to FIG. 8 illustrating a second embodiment of the automatic sequential operation of the air filtering system of this invention.

A second embodiment of the fluidic timing mechanism, indicated generally at 201, is illustrated in FIG. 10 whereupon the system is substantially identical to the fluidic timing mechanism 15 except for the addition of a timer circuit means 203 and a restart circuit means 205 added thereto. The fluidic timing mechanism 201 similarly includes the air pressure supply 46 feeding pressure to the air reservoir tank 48; rapid release air valve means 50 each provided with a connection by a conduit 49 to the reservoir tank 48 and also to the outlet conduit 51 having the downwardly depending discharge tubes 52 positioned at the open end and extended downwardly within respective filtering bag assemblies 38; the diaphragm valve means 54 connected to respective ones of the rapid release valve means 50 as by the conduits 101; the air actuated control valves 55 connected to the respective ones of the diaphragm valve means 54 by the conduits 103 and also to the respective slide valve members 56, 57, and 58 as by the lines 142; and the slide valve members, 56, 57, and 58 are connected to the respective outlet conduits 51 of the air valve means 50 as by conduits 146. In the fluidic timing mechanism 15, a conduit 150 is connected from the reservoir tank 48 to supply fluid to all of the slide valve members 56, 57, and 58; however, in this embodiment of the fluidic timing mechanism 201, the conduit 150 is connected to the timer means 203 as by lines 206 and 208 and then fluid is supplied through a line 210 to respective ones of the slide valves 56, 57, and 58.

In the circuit means 203, a fourth valve means or timer relay valve 212 is provided having the line 206 connected to one end whereupon the line 208 is interconnected through a pressure release valve 214 to the opposite end thereof. The timer relay valve 212 is of a pressure actuated type movable in response to differential pressure and, as shown in FIG. 10, is of the normally closed type whereupon fluid flow is not accessible from line 208 to a line 215 through the valve. The pressure release valve 214 is of an adjustable type whereupon the operating pressure may be set, for example, between 10 and 20 pounds as by a spring loaded mechanism to allow only the desired air pressure therethrough.

The restart circuit means 205 includes a fifth valve means or pressure actuated, recycle valve 218 connected as by lines 220 and 221 between the line 210 and the line 142 which operates to by-pass the slide valve member 56. The recycle valve 218 is of a spring loaded type adjustable to a pre-determined pressure whereupon the same is normally closed but opened on reaching a given pressure such as 15 to 20 pounds to permit fluid flow from the lines 210 and 220 through the recycle valve 218, and line 221 to the line 142 in order to operate the air actuated control valve 55 in a normal manner. As will be explained, the recycle valve 218 operates as the means for restarting the entire sequential operation of this system whereupon if the same was not present and one of the slide valve members 56, 57, or 58, for example, became inoperative, the restart circuit means 205 would overside the normal operations, due to an increase of air pressure within the line 210 so as to restart the entire sequential operation starting with the system A.

In the use and operation of the fluidic timing mechanism 201 as shown in FIG. 10, the remaining systems B and C are structurally identical to the previously described fluidic timing mechanism 15 whereupon the system A has been merely changed by addition of the timer circuit means 203 and the restart circuit means 205 to provide for more sensitive operation thereof.

The system as shown in FIG. 10 is a fragmentary view whereupon it is understood that the additional systems B and C are interconnected thereto so as to resemble the entire system as illustrated in FIG. 7. On an increase of pressure within the reservoir 48 receiving fluid pressure from the fluid supply line 46, the air therein is conveyed through the conduits 155 and 157 to the air actuated control valves 55 to close the diaphragm valves 54 as previously described and, additionally, through lines 150, 206, 208, and the pressure release valve 214 to opposite ends of the timer relay valve 212. In this example, we shall assume that the pressure release valve 214 has been set to allow pressure to flow therethrough at approximately ten pounds per square inch and that the timer relay valve 212 has been set to be operable on a pressure differential of three pounds per square inch. Therefore, upon reaching a pressure of approximately thirteen pounds per square inch in the reservoir tank 48, it is seen that ten pounds per square inch would be conveyed lines 150, 208, through the release valve 214 and thirteen pounds per square inch would be conveyed through lines 150 and 206. The timer relay valve 212 would then move to the right as shown by the dotted lines in FIG. 10 to open the line 215 to line 210 to the pressure from the reservoir tank 48. With the slide valve member 56 in the position as shown in FIG. 10, the air pressure in line 210 is thereupon conveyed through line 142 to the lower portion of the air actuated control valve 55. This operates to immediately operate the control valve 55 to bleed off pressure within the diaphragm valve 54 to actuate the rapid release valve means 50 as previously described to provide immediate fluid flow through conduit 49 into conduit 51 for discharge through the tubes 52 in a manner as previously described. Also, pressure through line 146 in system A operates to sequentially operate the slide valve member 56 and 57 for continuous operation as previously described.

It is obvious that the air actuated control valves 55 may be adjusted so as to be operable upon a small pressure such as three pounds per square inch so as to be immediately actuated on operation of the timer relay valve 212 and air flow through the respective slide valves 56, 57, and 58 for more positive control thereof. The use of the timer circuit means 203 is more desirable and sensitive to operate as the same can be operable on any given pressure differential and can therefore have a wide range of pressure usages depending upon the setting of the pressure release valve 214.

The restart circuit means 205 is a safety type feature whereupon, for example, if one of the slide valves 56, 57, or 58 are inoperative, this would cause the entire fluidic timing mechanism 201 to be inoperative which would be very undesirable especially where perhaps hundreds of filtering bags are being cleansed thereby. However, the restart circuit means 205 is operable upon receiving fluid pressure through lines 150, 208, 215, the timer relay valve 212, and line 210 to be opened upon reaching a pre-determined pressure such as 15 to 20 pounds per square inch. The valve 218 operates to allow fluid to flow through the line 221 and line 142 to the air actuated control valve 55 in the system A and operates the same as if slide valve 56 was in the position as shown in FIG. 10 regardless of the actual position thereof.

It is seen that the air filtering system of this invention provides a new and novel means for cleaning a plurality of filtering bag assemblies in a most efficient and effective manner using efficient high volume, low pressure air obtainable from a relatively inexpensive compressor. The important in this operation as the air produced is more use of a low pressure producing compressor is extremely pure than high pressure air which contains oil impurities and moisture. This provides for greater life of the filtering bags as they do not become coated with these impurities which are difficult to remove. The air filtering system of this invention provides a sequentially and automatic filtering means for cleaning the bag assemblies not requiring the use of electrical power or the like which is extremely dangerous in dust-type atmospheres. The rapid release valve means of this invention is readily operable without the use of the diaphragm member as shown in FIG. 11 as this merely provides a refinement thereof for adjustable control on speed of operation and resultant force in lifting the piston member. It is also obvious that the rapid release valve means of this invention can be operated in the position as shown in FIG. 4 or inverted therefrom. It is noted that the building up of air pressure within the reservoir tank, which can be regulated, prior to actuation and opening of the air actuated control valve operates as at timing mechanism in conjunction with the setting of the compression spring in the control valves.

It will be apparent from the foregoing description of preferred specific embodiments that the applicants' new and novel air filtering system, a relatively simple and inexpensive means is provided readily attachable to conventional filtering systems so as to provide an efficient, low cost effective means of providing automatic and sequential cleansing of filtering bags without danger of explosion due to electrical spark and the like. Applicants' construction eliminates a great deal of time consuming and tedious work involved in replacing and cleansing filtering bags achieving substantial time and monetary savings.

While the invention has been described in conjunction with preferred specific embodiments thereof, it will be understood that this description is intended to illustrate and not to limit the scope of the invention which is defined by the following claims.

We claim:

1. A fluidic timing mechanism operable in an air-filtering system having a plurality of bag assemblies to release large volume, low pressure fluid thereto for cleansing purposes, comprising:

(a) rapid release valve means having an inlet and an outlet, said outlet having a plurality of discharge openings positioned adjacent the bag assemblies to sequentially discharge fluid therein, said rapid release valve means movable from opened to closed positions under differential pressure to allow passage of air flow therethrough;

(b) first valve means movable from opened to closed positions under pressure differential;

(c) second valve means movable from opened to closed positions responsive to fluid pressure supply thereto;

(d) third valve means movable under fluid pressure to open and close a fluid flow channel therethrough;

(e) fluid supply means having a reservoir tank continuously supplied with fluid pressure at a predetermined rate;

(f) condiut means interconnecting said reservoir tank to said inlet, said second valve means, and said third valve means; said first valve means to said rapid release valve means and said second valve means; said outlet to said third valve means; said third valve means to said second valve means, wherein under one set of conditions of said third valve means, pressure fluid is supplied to actuate said second valve means and through said second valve means into said first valve means to hold same in the closed condition allowing fluid pressure build-up in said reservoir tank; and (g) said second valve means operable on reaching a predetermined pressure, being a second set of conditions, to actuate said rapid release valve means for movement to the fully opened position allowing large volume, low pressure fluid flow from said inlet through said outlet for discharge through said opening.

2. A fluidic timing mechanism as described in claim 1, wherein:

(a) said rapid release valve means having a movable piston member operable to seal fluid flow between said inlet and outlet in the normally closed position, said piston member having a groove therein operable to permit fluid pressure to flow from said inlet to both sides of said piston member whereby release of pressure from one side of said piston member results in axial movement rapidly in the opposite direction to permit fluid flow from said inlet to said outlet.

3. A fluidic timing mechanism as described in claim 2, wherein:

(a) said rapid release valve means having a spring member engageable with said piston member to bias the same in the closed position whereupon the release of air pressure on the same side of said spring member of said piston member oeprable to force said piston member toward said spring member in opening said inlet and outlet conduits to the fullest extent and said spring member then returns said piston member to the closed position.

4. A fluidic timing mechanism as described in claim 2, wherein:

(a) said rapid release valve means having a housing member provided with opposed rectangular openings integral with said inlet and outlet, respectively, whereby movement of said piston member a minimum amount axially results in a maximum opening of said inlet and outlet allowing for the rapid passage of large volume, low pressure fluid therethrough.

5. A fluidic timing mechanism as described in claim 2, wherein:

(r) said rapid release valve means having a piston rod member connected to said piston member, an enlarged diaphragm housing mounted on one side of said piston member and a diaphragm member mounted in said housing connected in sealed relationship to said piston rod member; and (b) said piston rod member having a hole therein to supply fluid pressure to opposite sides of said diaphragm member whereupon air pressure in said inlet is supplied to both sides of said piston member and said diaphragm member whereupon release of air pressure from one side of said piston member operates to move the same to the fully opened position and the immediate release of air pressure on the one side of said diaphragm member results in the air pressure on the opposite side providing a large force in moving said piston member rapidly and most efficiently to the fully open position.

6. A fluidic timing mechanism as described in claim 1, wherein:

(a) said second valve means having a plunger member therein operable in the normal position to permit air flow therethrough from said reservoir tank to said first valve means for holding said first valve means in the closed position;

(b) said plunger member connected by said conduit means through said third valve means to said reservoir tank and being movable in response to air pressure from said reservoir tank; and (c) said plunger member movable by a predetermined fluid pressure to the closed position to cease flow of fluid pressure to said first valve means resulting in the movement of said first valve means to the opened position thereby releasing air pressure in said rapid release valve means for immediately aligning said first said inlet and outlet for fluid communication.

7. A fluidic timing mechanism as described in claim 1, wherein:

(a) a plurality of sets of said rapid release valve means, said first valve means, said second valve means, and said third valve means are provided to release air to the respective ones of said outlet to clean respective groups of the filtering bag assemblies; and (b) said conduit means interconnecting each of said third valve means with another one of said other third valve means providing for the automatic, sequential operation of said sets of said rapid release valve means and said first, second, and third valve means.

8. A fluidic timing mechanism as described in claim 1, wherein:

(a) said third valve means having an outer housing and an axially movable slide member therein operable to open and seal the fluid flow from said reservoir tank to said second valve means, and said third valve means having said slide member operable on pressure applied to opposite ends thereof received from said outlet on actuation of said rapid release valve means.

9. A fluidic timing mechanism as described in claim 1, wherein:

(a) said first valve means having a diagram movable from an opened position to permit fluid leakage from said rapid release valve means to a second sealed position under fluid pressure to permit fluid pressure build-up in said rapid release valve means.

10. A fluidic timing mechanism as described in claim 1, wherein:

(a) said rapid release valve means having a movable piston member operable to seal fluid flow between said inlet and outlet in the normally closed position, said piston member movable within a bore extended transversely of said inlet and outlet, said piston member movable within a bore extended transversely of said inlet and outlet, said piston member of less diameter than said bore to permit fluid pressure to flow from said inlet to both sides of said piston member whereby release of pressure from one side of said piston member results in axial movement rapidly in the opposite direction to permit fluid flow from said inlet to said outlet.

11. A fluidic timing mechanism as described in claim 1, including:
   (a) fourth valve means movable under fluid pressure differential to open and close a fluid flow channel therethrough; and
   (b) said fourth valve means mounted in said conduit means between said reservoir tank and said third valve means whereby said fourth valve means operable under a predetermined pressure differential to supply pressure fluid to said third valve means for operation of respective ones of said second valve means.

12. A fluidic timing mechanism as described in claim 11, wherein:
   (a) said conduit means having first and second conduits connected to said fourth valve means from said reservoir tank providing pressure fluid acting against each other;
   (b) said fourth valve means having a pressure relief valve mounted in said second conduit to cause different pressure flow in said first and second conduits operable to actuate said fourth valve means for fluid flow therethrough from said reservoir tank.

13. A fluidic timing mechanism as described in claim 1, including:
   (a) fifth valve means movable under fluid pressure to open and close a fluid flow channel therethrough; and
   (b) said fifth valve means mounted in said conduit means between said reservoir tank and said second valve means operable on reaching a predetermined fluid pressure to bypass said third valve means and pass fluid pressure from said reservoir tank to said second valve means.

14. A fluidic timing mechanism as described in claim 11, including:
   (a) a fifth valve means movable under fluid pressure to open and close a fluid flow channel therethrough; and
   (b) said fifth valve means mounted in said conduit means between said fourth valve means and said second valve means operable under a predetermined pressure to pass fluid therethrough; and
   (c) said fifth valve means to receive fluid on actuation of said fourth valve means from same and by-pass the fluid to said second valve means on reaching a predetermined pressure.

References Cited

UNITED STATES PATENTS

| | | | |
|---|---|---|---|
| 2,368,787 | 2/1945 | Skinner | 55—283 X |
| 2,909,239 | 10/1959 | Bennett | 55—283 X |
| 2,980,207 | 4/1961 | Allen | 55—283 |
| 3,073,097 | 1/1963 | Hallett et al. | 55—283 |
| 3,394,532 | 7/1968 | Oetiker | 55—302 |
| 3,457,893 | 7/1969 | Lavalier | 251—45 X |

DENNIS E. TALBERT, Jr., Primary Examiner

U.S. Cl. X.R.

55—284, 293, 302, 341; 137—488; 251—45; 302—59

UNITED STATES PATENT OFFICE
CERTIFICATE OF CORRECTION

Patent No. 3,521,430  July 21, 1970

Herbert D. Vanderlip et al.

It is certified that error appears in the above identified patent and that said Letters Patent are hereby corrected as shown below:

Column 1, line 23, "and" should read -- an --; line 44, "conveyor" should read -- conveyed --. Column 2, line 69, "therethroubh" should read -- therethrough --. Column 7, line 53, "tn" should read -- in --. Column 10, line 10, "operate" should read -- operation --; lines 34 and 35, "important in this operation as the air produced is more use of a low pressure producing compressor is extremely" should read -- use of a low pressure producing compressor is extremely important in this operation as the air produced is more --. Column 11, line 20, "condiut" should read -- conduit --; line 56, "oeprable" should read -- operable --. Column 12, line 58, "diagram" should read -- diaphragm --.

Signed and sealed this 23rd day of February 1971.

(SEAL)

Attest:

Edward M. Fletcher, Jr.  
Attesting Officer

WILLIAM E. SCHUYLER, JR.  
Commissioner of Patents